US012560509B2

(12) United States Patent     (10) Patent No.:   US 12,560,509 B2
Matsuda et al.           (45) Date of Patent:     Feb. 24, 2026

(54) OPTICAL FIBER SENSOR FOR STRUCTURAL ACOUSTIC ABNORMALITY MONITORING

(71) Applicant: NEC Corporation, Tokyo (JP)

(72) Inventors: Yuma Matsuda, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 412 days.

(21) Appl. No.: 18/022,463

(22) PCT Filed: Aug. 27, 2020

(86) PCT No.: PCT/JP2020/032366
§ 371 (c)(1),
(2) Date: Feb. 21, 2023

(87) PCT Pub. No.: WO2022/044203
PCT Pub. Date: Mar. 3, 2022

(65) Prior Publication Data
US 2023/0324254 A1     Oct. 12, 2023

(51) Int. Cl.
| | |
|---|---|
| *G01M 7/02* | (2006.01) |
| *E01D 22/00* | (2006.01) |
| *G01D 5/353* | (2006.01) |
| *G01H 9/00* | (2006.01) |
| *G01M 99/00* | (2011.01) |

(52) U.S. Cl.
CPC ............. *G01M 7/025* (2013.01); *E01D 22/00* (2013.01); *G01D 5/35354* (2013.01); *G01H 9/004* (2013.01); *G01M 99/00* (2013.01)

(58) Field of Classification Search
CPC ......... G01H 9/004; G01H 9/00; G01M 7/025; G01M 99/00; E01D 22/00; G01D 5/35354

USPC .......................................................... 73/655
See application file for complete search history.

(56) References Cited

U.S. PATENT DOCUMENTS

| | | | |
|---|---|---|---|
| 2002/0198669 | A1 | 12/2002 | Lusted et al. |
| 2020/0190971 | A1* | 6/2020 | Thiruvenkatanathan ................... G01V 1/288 |
| 2020/0291772 | A1* | 9/2020 | Thiruvenkatanathan ................... E21B 47/18 |

(Continued)

FOREIGN PATENT DOCUMENTS

| | | |
|---|---|---|
| JP | 2001-099755 A | 4/2001 |
| JP | 2001-311724 A | 11/2001 |

(Continued)

OTHER PUBLICATIONS

International Search Report for PCT Application No. PCT/JP2020/032366, mailed on Oct. 20, 2020.

(Continued)

*Primary Examiner* — Peter J Macchiarolo
*Assistant Examiner* — Monica S Young
(74) *Attorney, Agent, or Firm* — Sughrue Mion, PLLC

(57) ABSTRACT

Provided is an optical fiber sensor that is capable of highly accurately detecting an abnormality in a structure from vibration information. This optical fiber sensor includes an optical fiber that is laid in the vicinity of a structure, a light source for introducing pulsed light of a specific period into the optical fiber, and an optical sensor for detecting return light that has been obtained as a result of the introduction of the pulsed light into the optical fiber. The structure is determined to have an abnormality if the spectral centroid of vibration information exceeds a threshold.

12 Claims, 19 Drawing Sheets

(56)       References Cited

U.S. PATENT DOCUMENTS

| | | | |
|---|---|---|---|
| 2021/0047916 A1* | 2/2021 | Thiruvenkatanathan ..................... E21B 47/135 | |
| 2021/0115785 A1* | 4/2021 | Cerrahoglu ............. E21B 47/07 | |
| 2021/0164812 A1* | 6/2021 | Adeyemi ............... G01H 9/004 | |
| 2021/0341352 A1 | 11/2021 | Kinoshita et al. | |
| 2021/0388716 A1* | 12/2021 | Cerrahoglu ............ G01K 11/32 | |

FOREIGN PATENT DOCUMENTS

| | | | |
|---|---|---|---|
| JP | 2009-229070 A | 10/2009 | |
| JP | 2010-169465 A | 8/2010 | |
| WO | 2020/044565 A1 | 3/2020 | |

OTHER PUBLICATIONS

English translation of Written opinion for PCT Application No. PCT/JP2020/032366, mailed on Oct. 20, 2020.

* cited by examiner

Fig. 1

VIBRATION
INFORMATION
COLLECTION
MEANS

11

CENTROID
DERIVATION
MEANS

12

ABNORMALITY
DETECTION
MEANS

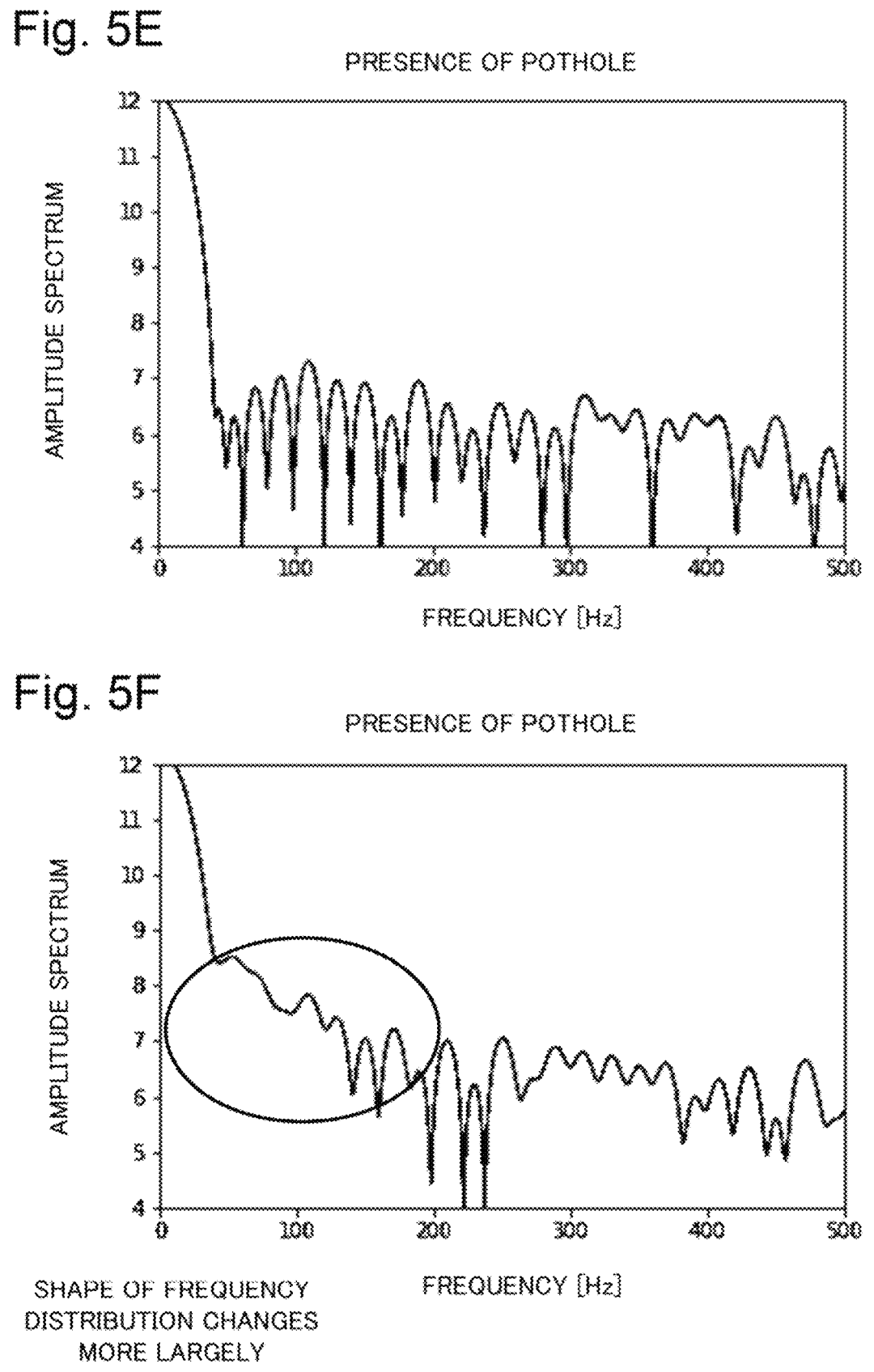

PRESENCE OF POTHOLE

FREQUENCY [Hz]

Fig. 5F

PRESENCE OF POTHOLE

SHAPE OF FREQUENCY
DISTRIBUTION CHANGES
MORE LARGELY

FREQUENCY [Hz]

SPECTRUM CENTROID $C_t$

TIME $$C_t = \frac{\sum_{k=1}^{K} M_t[k] * k}{\sum_{k=1}^{K} M_t[k]}$$

$M_t[k]$: FREQUENCY AMPLITUDE AT k Hz

DERIVE CENTROID OF CALCULATED FREQUENCY
DISTRIBUTION FOR EACH TIME

LINEAR WEIGHTED MOVING AVERAGE

TIME $$x_{S,t} = \frac{\sum_{j=1}^{n}\{(n-j+1)x_{t-j+1}\}}{\sum_{j=1}^{n}(n-j+1)}$$

ELIMINATE INFLUENCE OF GRADUAL TIME-DEPENDENT CHANGE
BY MOVING AVERAGE

THRESHOLD VALUE FROM HAMPEL
IDENTIFIER

FALSE REPORT DUE TO
ENVIRONMENT NOISE

MEASUREMENT RESULT AT OBSERVATION POINT A

MEASUREMENT RESULT AT OBSERVATION POINT B

OPTICAL FIBER SENSOR FOR STRUCTURAL ACOUSTIC ABNORMALITY MONITORING

This application is a National Stage Entry of PCT/JP2020/032366 filed on Aug. 27, 2020, the contents of all of which are incorporated herein by reference, in their entirety.

TECHNICAL FIELD

The present invention relates to an optical fiber sensor and a detection method, and more particularly to an optical fiber sensor and a detection method that detect an abnormality of a structure.

BACKGROUND ART

For wide-range abnormality detection in a large-scale structure or a long and large structure such as a plant and an infrastructure, optical fiber sensing that enables continuous monitoring for a long distance is useful. PTL 1 relates to an optical fiber sensor, and proposes that deformation, collapse, or the like of an inclined surface is observed by changing to a form of deformation, breakage, or the like of an optical fiber. PTL 2 relates to a soundness determination method for concrete, and proposes that soundness of concrete is determined based on propagation of a hitting sound generated by hitting the concrete or the like.

It is assumed that a road is one example of a plant or an infrastructure, and it is assumed that wide-range abnormality detection is performed for a long distance on the road. It is known that a pothole is formed on a road surface due to aging of the road. When a wide-range search for a pothole in the road for a long distance is performed, a searcher patrols along the road by an automobile while the searcher performs visual inspection, and thereby time and cost increase.

When performing such a pothole search is achieved with optical fiber sensing, time and cost are advantageously suppressed.

Next, description is made on an assumed pothole search using optical fiber sensing in the related art. Optical fiber sensing is performed by, for example, introducing pulsed light with a specific cycle from a light source to an optical fiber running through in a vicinity of a structure being a search target and detecting return light acquired from introduction of the pulsed light to the optical fiber. Presence or absence and intensity of vibration are observed from a temporal change in a waveform of the return light, and thus a specific position of the optical fiber being running through and vibration information on the structure at the position can be collected.

FIG. 13 is a schematic diagram for describing an assumed pothole search method with optical fiber sensing in the related art. In FIG. 13, an optical fiber 151 is laid along a road being one example of a structure, and a sensing device 152 that collects vibration information from the optical fiber 151 is connected to the optical fiber 151. It is assumed that the optical fiber 151 is laid along a longitudinal direction of a road 150, and the sensing device 152 is capable of collecting vibration information on the road 150 from any position of the optical fiber 151. As one example, FIG. 13 illustrates a state in which one pothole 150p is formed in the road 150. It is assumed that an observation point of the optical fiber, the observation point being closest to the pothole 150p, is denoted with A, and an observation point being sufficiently away from the observation point A and having no pothole nearby is denoted with B.

In the optical fiber sensing in the related art, when, for example, an automobile 155 travels along the longitudinal direction of the road 150, vibration information caused by the automobile traveling nearby is collected at an observation point such as the observation point A and the observation point B. For example, the vibration information is collected as intensity of vibration with respect to a time (time point).

FIGS. 14A and 14B are graphs illustrating one example of intensity of vibration with respect to a time (time point) at the observation point B of the optical fiber and one example of intensity of vibration with respect to a time (time point) at the observation point A of the optical fiber. In FIGS. 14A and 14B, a horizontal axis indicates an elapse time (time point), and a vertical axis indicates intensity of vibration being observed. FIGS. 14A and 14B are acquired by graphing an intensity value of interference light due to measured vibration.

As understood from FIGS. 14A and 14B, a pothole search cannot be performed directly from a peak value of vibration intensity at the observation point or a time thereof. In other words, in FIGS. 14A and 14B, a peak value of vibration intensity in vibration information at the observation point B that has no pothole nearby is larger than a peak value of vibration intensity in vibration information at the observation point A that has the pothole 150p nearby in FIG. 13. Further, a plurality of peaks larger than the peak value of the vibration intensity in the vibration information at the observation point A are observed in FIG. 14A. Thus, it can be understood that a position of a pothole cannot be specified just by setting a threshold value for the vibration intensity and confirming a fact that a peak value of the vibration intensity exceeds the threshold value, and the number of potholes present in the road cannot be specified based on the number of positions at which a peak value of the vibration intensity exceeds the threshold value.

Thus, when abnormality detection such as a pothole search is performed based on intensity of vibration with respect to a time (time point), there is a problem that detection accuracy is degraded.

CITATION LIST

Patent Literature

[PTL 1] Japanese Unexamined Patent Application Publication No. 2001-099755
[PTL 2] Japanese Unexamined Patent Application Publication No. 2001-311724

SUMMARY OF INVENTION

Technical Problem

With an analysis method using the above-mentioned optical fiber sensing in the related art, there is a problem that discrimination of abnormality cannot be performed and an abnormality cannot be detected.

The plurality of peaks illustrated in in FIG. 14A are peaks larger than the peak value of the vibration intensity in the vibration information at the observation point A in FIG. 14B. The plurality of peaks are conceived to be caused by sudden vibration occurring even when the automobile 155 passes on the road 150 without a pothole. Thus, the optical fiber sensing in the related art has a problem that vibration occurring due to presence of a pothole and vibration suddenly occurring regardless of absence of a pothole cannot be discriminated from each other by subjecting entire sensor data to statistical processing.

Intensity of occurring vibration being observed when the automobile 155 travels on the road 150 is irrelevant to presence or absence of a pothole. Thus, there is a problem that an intensity value of occurring vibration cannot be used for a pothole search or specification of a position of a pothole.

Herein, description is made on whether a frequency distribution of vibration can be used for determination as vibration information from a different point of view with regard to vibration occurring when an automobile passes on a road having a pothole formed therein. FIG. 5A and FIG. 5B are graphs illustrating one example of a frequency distribution of vibration occurring when an automobile passes on a road having a pothole formed therein. In FIGS. 5A and 5B, the horizontal axis indicates a frequency of vibration, and the vertical axis indicates an amplitude of the frequency of the vibration. As indicated in a range surrounded by a closed circle in FIG. 5B, what is understood from FIGS. 5A and 5B are that a peak of the frequency distribution gradually changes without a specific peak over the illustrated frequency range. Thus, it cannot be said that vibration occurring when an automobile passes on a road having a pothole formed therein has a specific frequency. As a result, there is a problem that a pothole cannot be searched for by detecting vibration having a specific frequency and a position of a pothole cannot be specified.

Therefore, an object of the present invention is to provide an optical fiber sensor and a detection method that enable detection of an abnormality of a structure with high accuracy from vibration information.

Solution to Problem

In order to achieve the above-mentioned object, an optical fiber sensor according to the present invention includes:

an optical fiber running in a vicinity of a structure; a light source that introduces pulsed light with a specific cycle to the optical fiber; and an optical sensor that detects return light acquired by introducing the pulsed light to the optical fiber, and determines that the structure has an abnormality when a spectrum centroid in vibration information exceeds a certain threshold value.

A detection method according to the present invention includes:

collecting vibration information on a structure, occurring when an object passes near the structure;

deriving a spectrum centroid from the vibration information being collected; and detecting an abnormality of the structure when the spectrum centroid exceeds a certain threshold value.

Advantageous Effects of Invention

According to the present invention, an optical fiber sensor and a detection method that enable detection of an abnormality of a structure with high accuracy from vibration information can be provided.

BRIEF DESCRIPTION OF DRAWINGS

FIG. 1 is a block diagram for describing an optical fiber sensor of an example embodiment according to a superordinate concept of the present invention.

FIG. 5E is a graph illustrating one example of a frequency distribution with regard to vibration occurring when an automobile passes on a road having a pothole.

FIG. 5F is a graph illustrating one example of a frequency distribution with regard to vibration occurring when an automobile passes on a road having a pothole.

EXAMPLE EMBODIMENT

Figure 1:
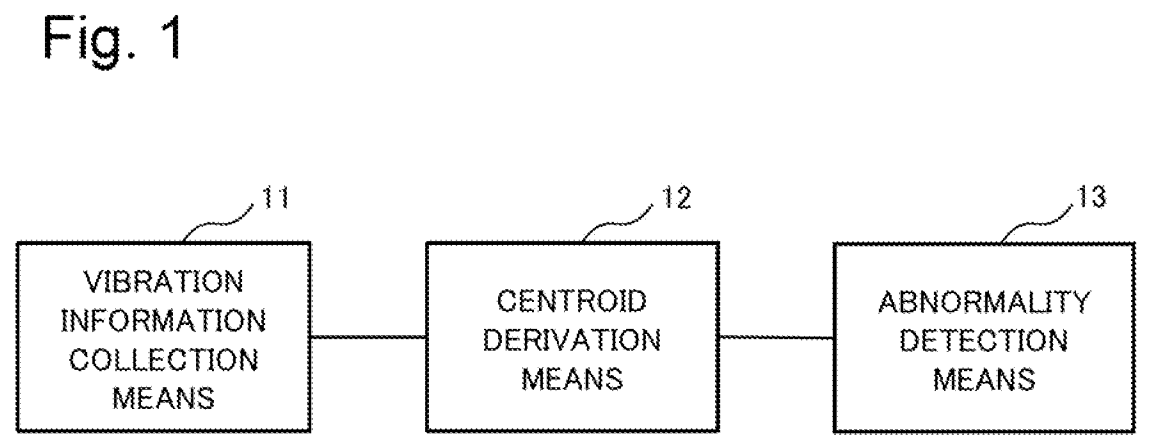
Figure 4:
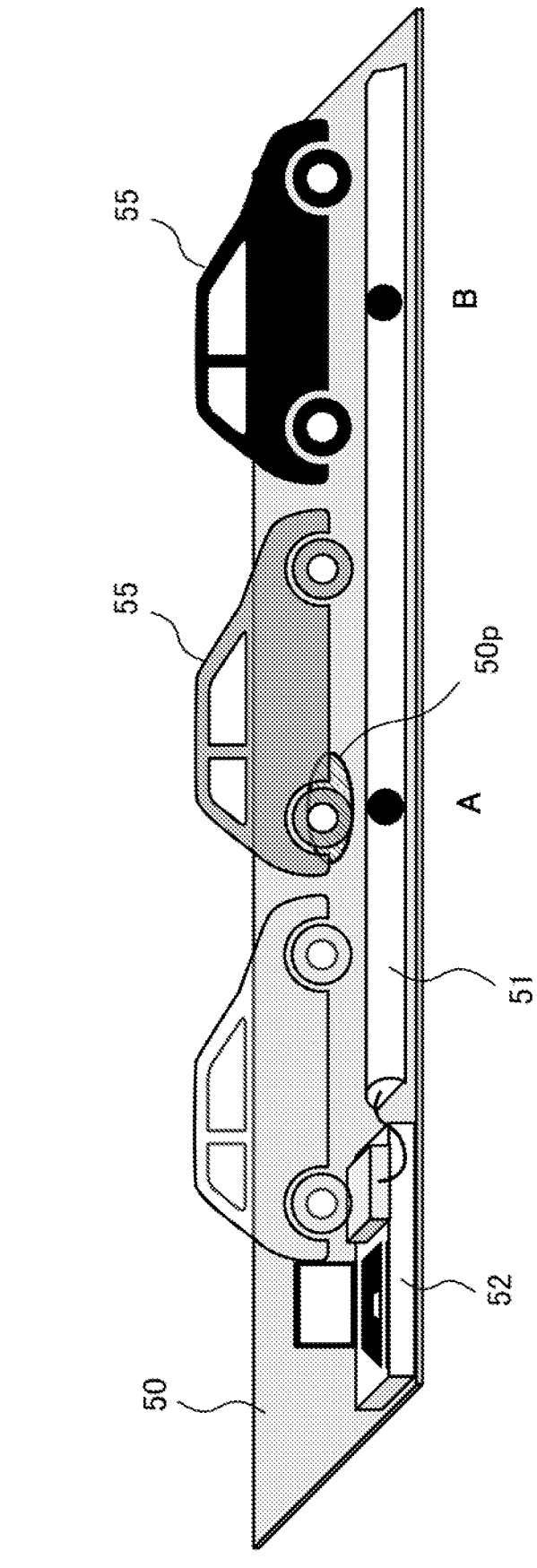
FIG. 4 is a conceptual diagram for describing an installation example of an optical fiber sensor system using an optical fiber sensor.
Figure 5A:
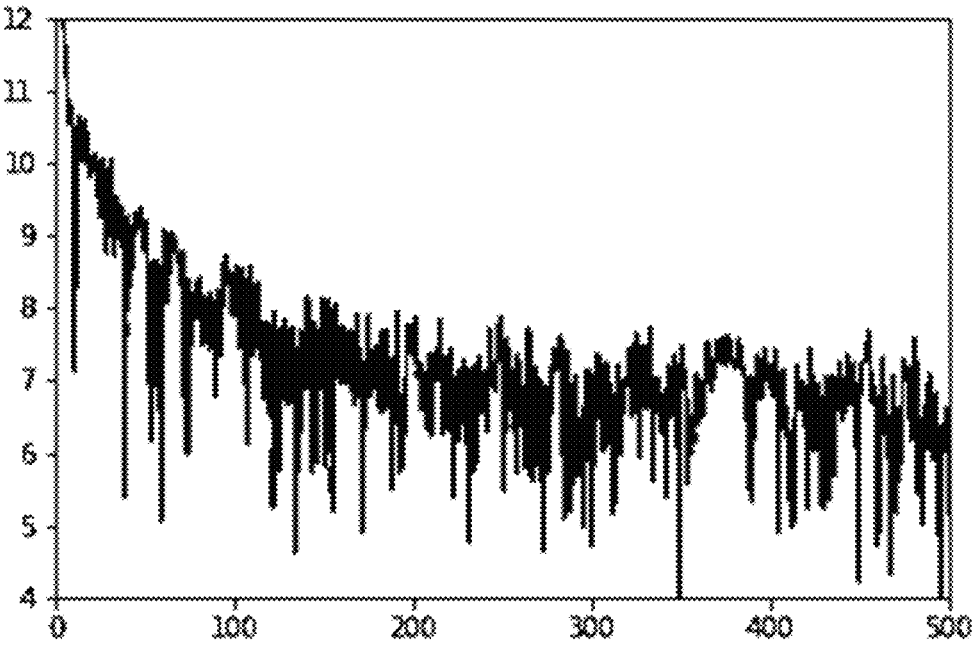
FIG. 5A is a graph illustrating one example of a frequency distribution with regard to vibration occurring when an automobile passes on a road having a pothole formed therein.
Figure 5B:
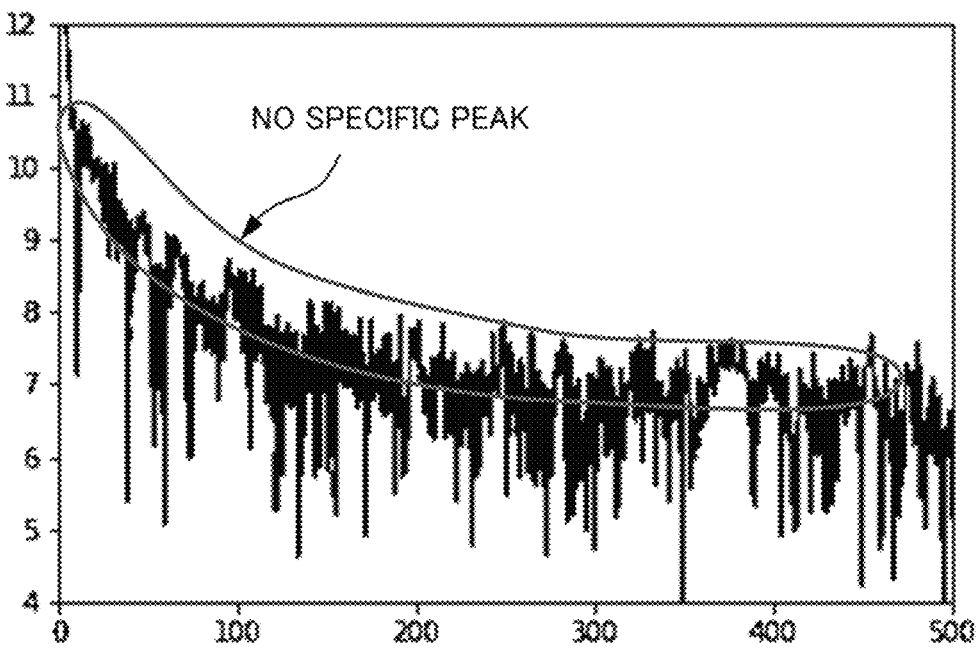
FIG. 5B is a graph illustrating one example of a frequency distribution with regard to vibration occurring when an automobile passes on a road having a pothole formed therein.
Figure 5C:
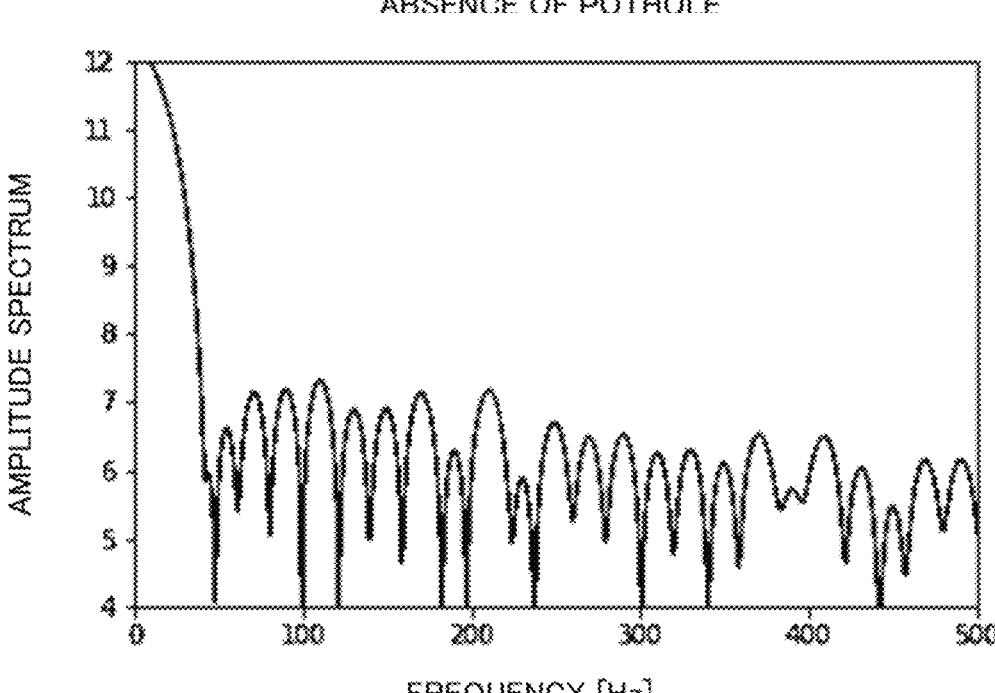
FIG. 5C is a graph illustrating one example of a frequency distribution with regard to vibration occurring when an automobile passes on a road without a pothole.
Figure 5D:
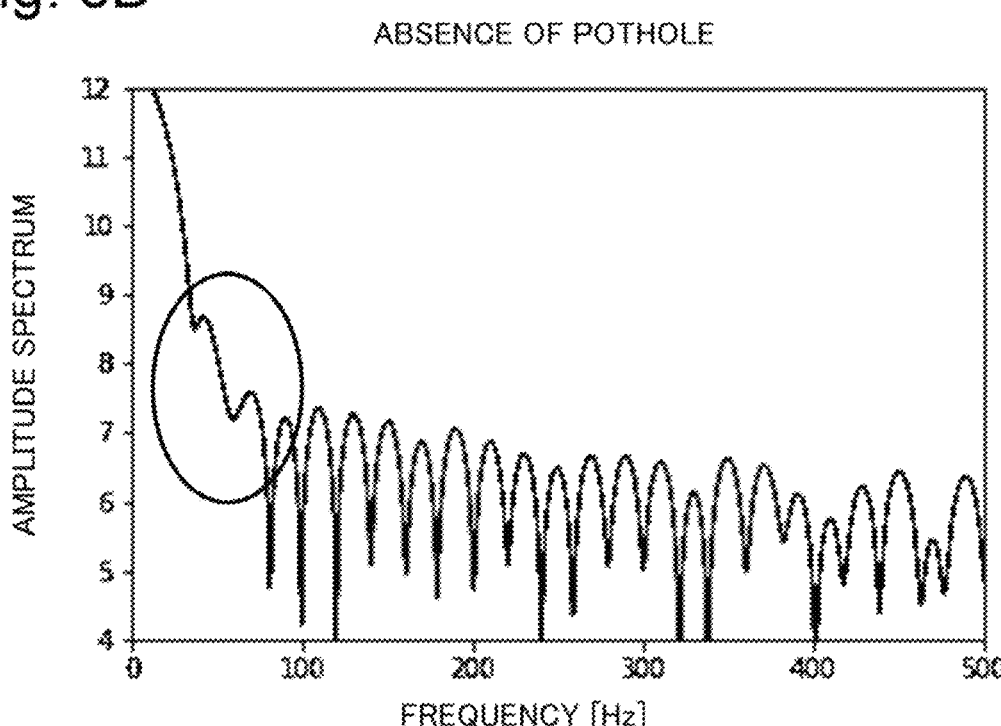
FIG. 5D is a graph illustrating one example of a frequency distribution with regard to vibration occurring when an automobile passes on a road without a pothole.

Prior to description on specific example embodiments of the present invention, an example embodiment according to a superordinate concept of the present invention is described. FIG. 1 is a block diagram for describing an optical fiber sensor of the example embodiment according to the superordinate concept of the present invention. FIG. 4 is a conceptual diagram for describing an optical fiber sensor system of the example embodiment of the present invention to which the optical fiber sensor in FIG. 1 is applied.

The optical fiber sensor system in FIG. 4 includes an optical fiber 51 laid along a longitudinal direction of a road and a sensing device 52 connected to the optical fiber 51 on the road being one example of a structure. The sensing device 52 includes the optical fiber sensor in FIG. 1. The optical fiber sensor in FIG. 1 includes a vibration information collection means 11, a centroid derivation means 12, and an abnormality detection means 13.

The vibration information collection means 11 collects vibration information on a structure. Particularly, vibration information of the structure, occurring when an object passes by a vicinity of the structure is collected. The vibration information is performed by detecting pulsed light being introduced by the sensing device 52 to the optical fiber 51 and return light acquired from introduction of the pulsed light to the optical fiber 51. Presence or absence and intensity of vibration are observed from a temporal change in a waveform of the return light, and a specific position of the optical fiber 51 and the vibration information on the structure at the position can be collected.

The centroid derivation means 12 derives a spectrum centroid from the collected vibration information. When the derived spectrum centroid exceeds a certain threshold value, the abnormality detection means 13 performs detection as an abnormality of the structure.

As one example of detection of an abnormality of a structure, description is made on detection of a pothole formed in a road. As described in detail with a specific example embodiment given below, vibration occurring when an automobile passes on a road having a pothole formed therein has a tendency that a shape of a frequency distribution largely changes over a wider frequency range, as compared to vibration occurring when an automobile passes on a road without a pothole.

The optical fiber sensor in FIG. 1 collects the vibration information of a road, occurring when an automobile passes on the road being one example of a structure. A spectrum centroid is derived from the vibration information being collected in such a manner. Further, when the derived spectrum centroid exceeds a certain threshold value, an abnormality of the structure, that is, formation of a pothole in the road herein is detected.

Accordingly, the optical fiber sensor of the present example embodiment enables detection of an abnormality of the structure with high accuracy, and enables a search for a pothole formed in the road as one example with high accuracy. More specific example embodiments are described below.

First Example Embodiment

Figure 2:
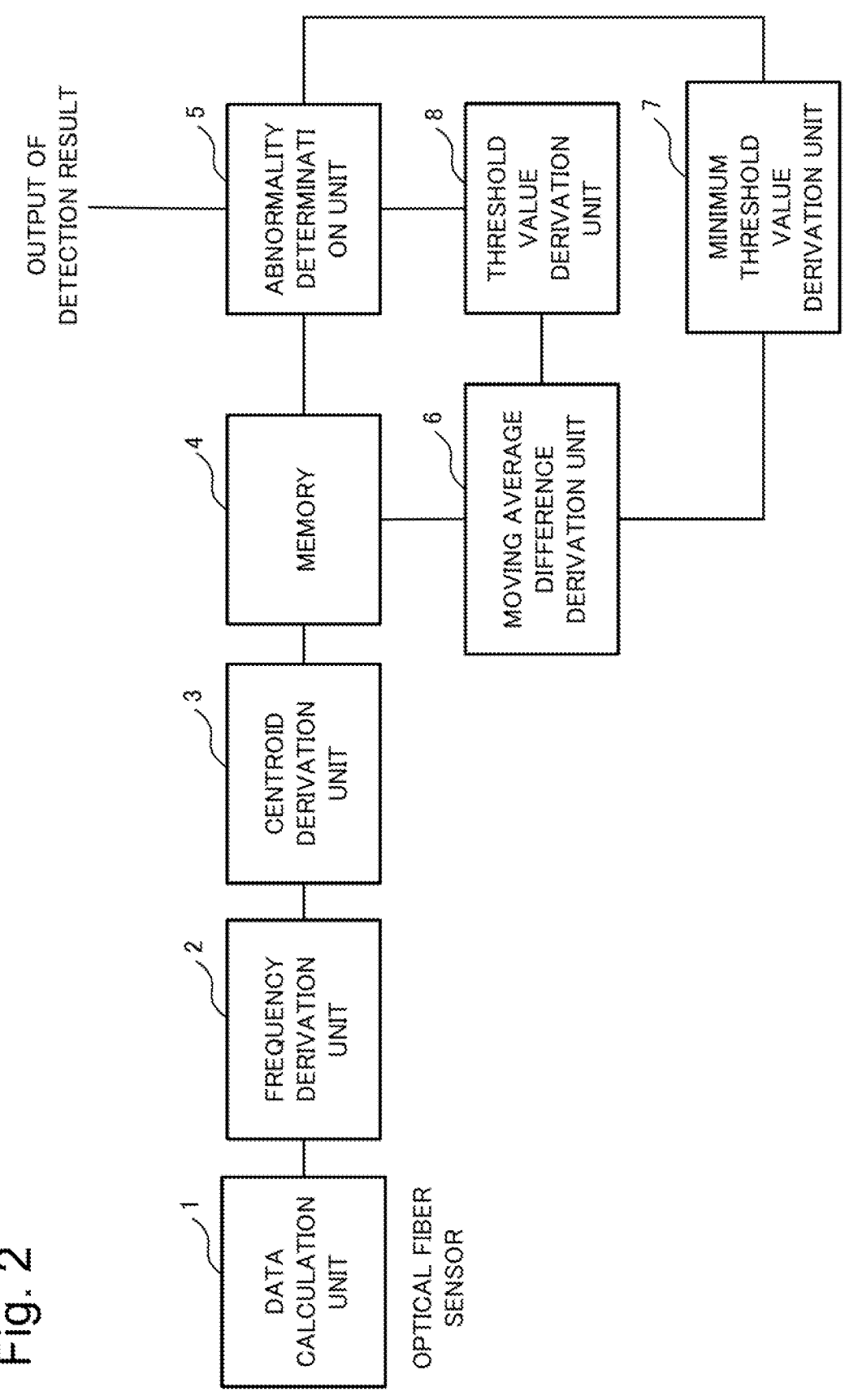
FIG. 2 is a block diagram for describing an optical fiber sensor of a first example embodiment of the present invention.

With reference to the drawings, an optical fiber sensor, a detection method, and an optical fiber sensor system of a first example embodiment of the present invention are described in detail. FIG. 2 is a block diagram for describing the optical fiber sensor of an example embodiment according to the first example embodiment of the present invention. (Configuration of Example Embodiment)

The optical fiber sensor in FIG. 2 includes a data calculation unit 1, a frequency derivation unit 2, a centroid derivation unit 3, a memory 4, an abnormality determination unit 5, a moving average difference derivation unit 6, a minimum threshold value derivation unit 7, and a threshold value derivation unit 8.

The optical fiber sensor system in FIG. 4 includes an optical fiber 51 laid along a longitudinal direction of a road and a sensing device 52 connected to the optical fiber 51 on the road being one example of a structure. The sensing device 52 collects vibration information of the structure by introducing pulsed light with a specific cycle from a light source to the optical fiber 51 running through a vicinity of the structure being a search target and detecting return light acquired from introduction of the pulsed light to the optical fiber 51. Presence or absence and intensity of vibration are observed from a temporal change in a waveform of the return light, and a specific position of the optical fiber 51 being running through and the vibration information on the structure at the position can be collected. In the optical fiber sensor system in FIG. 4, an measurement point can be set at any position along the longitudinal direction of the optical fiber 51, and the vibration information on the structure can be collected at the measurement point.

The data calculation unit 1 of the optical fiber sensor of the present example embodiment collects a specific position of the optical fiber 51 being running through and the vibration information on the structure at the position. Further, the frequency derivation unit 2 of the optical fiber sensor derives frequency information from the vibration information on the structure being collected by the data calculation unit 1.

The centroid derivation unit 3 derives a spectrum centroid for each minute time from a frequency distribution of measured vibration at an observation point. A spectrum centroid $C_t$ is expressed in an equation given below, where an amplitude of the measured vibration at a frequency k Hz is $M_t[k]$.

$$C_t = \frac{\sum_{k=1}^{K} M_t[k] * k}{\sum_{k=1}^{K} M_t[k]} \qquad \text{[Mathematical 1]}$$

When an abnormality occurs in a structure, for example, a pothole is formed in a road, the spectrum centroid changes.

In the soundness determination method for concrete in PTL 2 described above, when a crack occurs in concrete, a frequency centroid moves to a low frequency side due to degradation of rigidity caused by the crack. In PTL 2, an abnormality of the concrete is detected by detecting the frequency centroid moving to the low frequency side.

In contrast, when an abnormality occurs in a structure, for example, a pothole is formed in a road, there is a characteristic that the frequency centroid moves to a high frequency side. In the example embodiment of the present invention, an abnormality of the structure is discovered by detecting such a characteristic that the frequency centroid moves to the high frequency side.

When an automobile travels on a road, vibration occurs. An impact occurs by a level difference included in a pothole at a time of passing on the pothole, and vibration becomes vibration having a frequency component higher than vibration occurring at a time of traveling on a normal road without a pothole. The vibration is observed with an optical fiber capable of performing continuous measuring at many points, and thus an abnormality can be detected. At that occasion, with reference to vibration information observed at a plurality of points, an abnormality can be detected while reducing a false report.

The memory 4 accumulates values of the spectrum centroid for a certain time period. It is required to use values of the spectrum centroid for a certain time period (a time longer than a time from occurrence of vibration, which occurs when a vehicle passes on a pothole, to convergence) in order to acquire a moving average of a change of the spectrum centroid. From the values of the spectrum centroid being accumulated for the certain time period, the moving average of the change of the spectrum centroid can be acquired.

When determination at a measurement point is "an abnormality is present", the abnormality determination unit 5 determines that a structure in the vicinity of the measurement point has an abnormality. Preferably, when all the determination results at one measurement point and one or a plurality of vicinity points away from the measurement point by minimum space resolution included in the optical fiber sensor of the present example embodiment indicate "an abnormality is present", it is determined that the structure in the vicinity of the one measurement point has an abnormality.

The moving average difference derivation unit 6 acquires a linear weighted moving average with respect to the spectrum centroid derived by the centroid derivation unit 3. The linear weighted moving average $x_{s,t}$ is expressed in an equation given below.

$$x_{S,t} = \frac{\sum_{j=1}^{n} \{(n - j + 1)x_{t-j+1}\}}{\sum_{j=1}^{n} (n - j + 1)} \qquad \text{[Mathematical 2]}$$

Example Embodiment

Figure 9A:
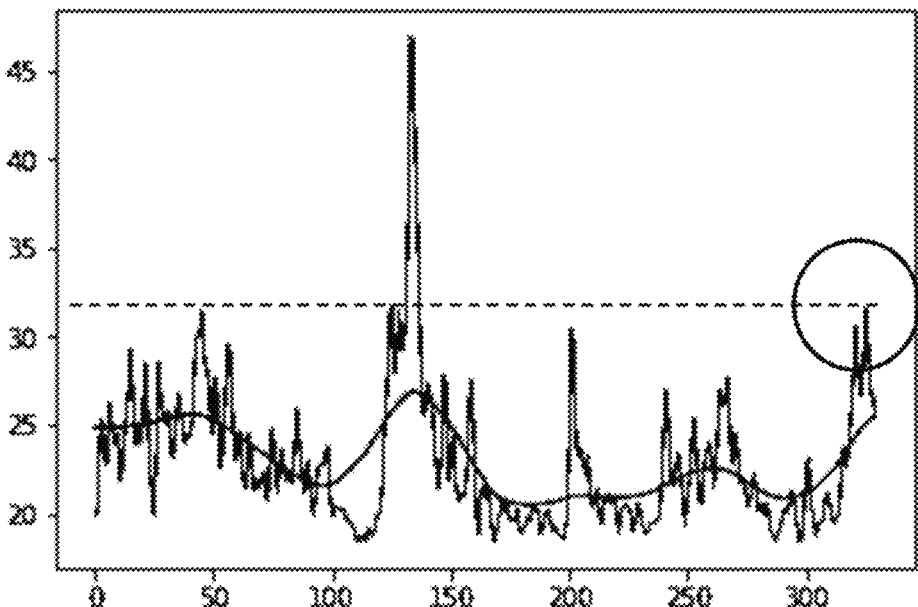
FIG. 9A is a graph illustrating a moving average difference acquired from a difference between the linear weighted moving average and the original spectrum centroid, with respect to the graph in FIG. 8.
Figure 9B:
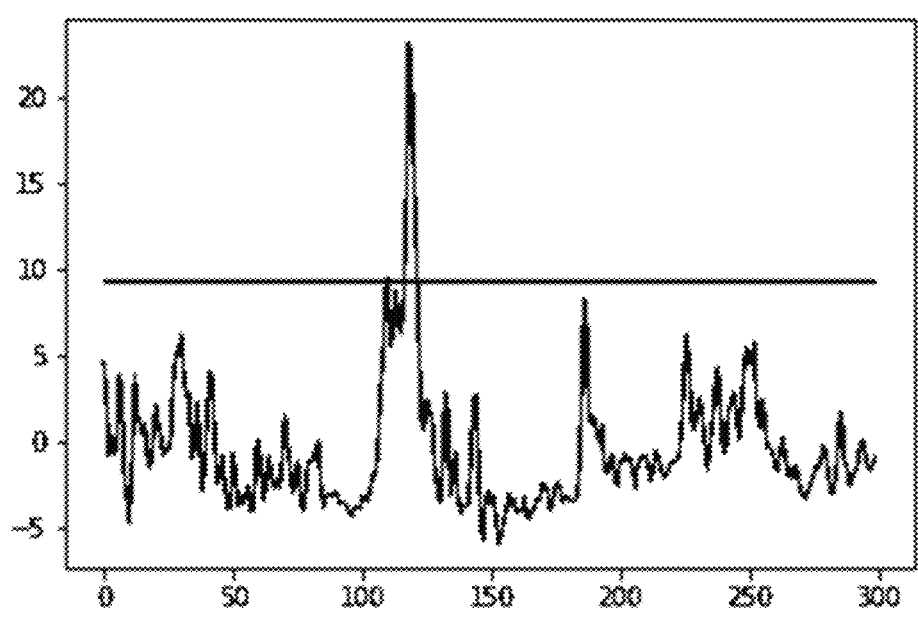
FIG. 9B is a graph illustrating a moving average difference acquired from a difference between the linear weighted moving average and the original spectrum centroid, with respect to the graph in FIG. 8.

A moving average difference is acquired from a difference between the linear weighted moving average and an original spectrum centroid. FIG. 9B indicates the moving average difference. In consideration of the moving average difference, a peak surrounded by a circle in FIG. 9A is a peak due to a time-dependent change of the spectrum centroid, and is not a peak caused by an abnormality of a structure. In this manner, the linear weighted moving average is considered, and thus an influence by a gradual time-dependent change of the spectrum centroid is eliminated. The moving average difference is used for detection of presence or absence of a pothole.

The threshold value derivation unit 8 deforms a Hampel identifier by a slight degree, and derives a threshold value. Further, the threshold value derived in such a manner and a certain threshold value are used in combination at a time of detection of an abnormality of a structure.

The Hampel identifier is a method of deriving a threshold value for detecting au outlier value. While assuming that data follow a normal distribution, an average value and a standard deviation are each replaced with a robust statistical amount. Specifically, the average value is replaced with a median value, and the standard deviation is replaced with a value 1.4826 times greater than a median absolute deviation. Herein, "1.4826" is a coefficient for performing correction in such a way as to acquire a value equal to the standard deviation when the data follow the normal distribution.

In the present example embodiment, the threshold value and the median absolute deviation are determined in the following manner.

Threshold value; median value±3.7×1.4826×median absolute deviation

Median absolute deviation; median value of |value at certain time−median value|

In general, the Hampel identifier uses "3" in place of "3.7" in the equation for the threshold value, but in the present example embodiment, "3.7" being a value greater than "3" is used. In this manner, in the present example embodiment, the Hampel identifier is deformed by a slight degree, and the threshold is derived.

Figure 10:
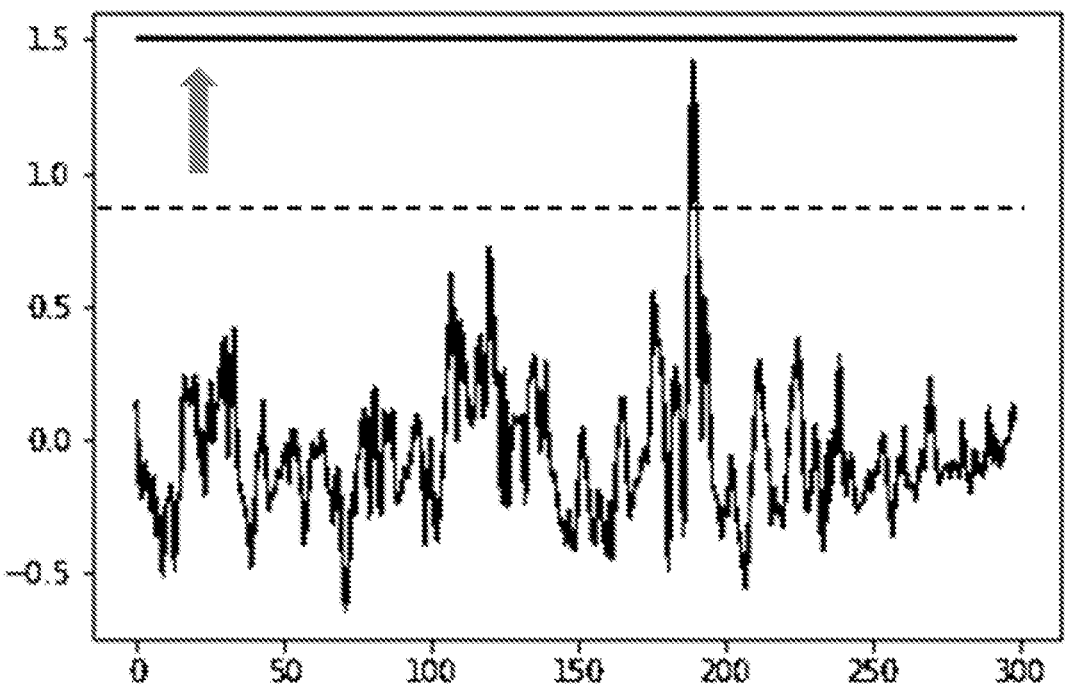
FIG. 10 is a graph for describing correction of a threshold value by a Hampel identifier.

The minimum threshold value derivation unit 7 acquires a minimum threshold value being slightly greater than a maximum value from variations of the spectrum centroid being measured in advance under a state without an abnormality. When environment noise is small, the threshold value is small, and a false report is easily generated. The minimum threshold value derivation unit 7 determines the minimum threshold value in such a way as to prevent generation of such a false report. The minimum threshold value derivation unit 7 raises a threshold value indicated with a dot line in FIG. 10 to a value indicated with a solid line, and thus determines the raised threshold value as the minimum threshold value.

(Operation of Example Embodiment)

Figure 3A:
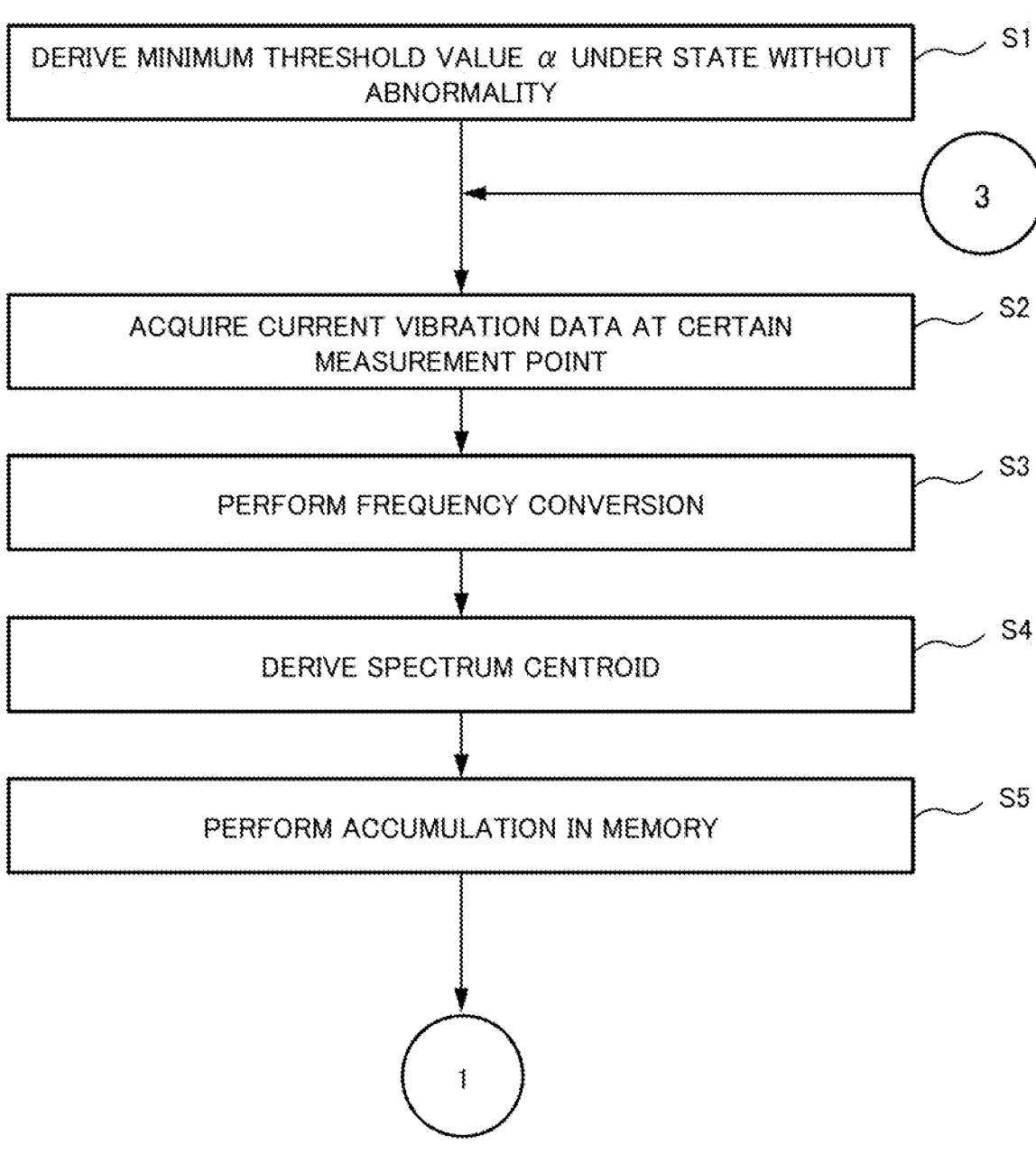
FIG. 3A is a flowchart for describing an operation of the optical fiber sensor of the first example embodiment of the present invention.
Figure 3B:
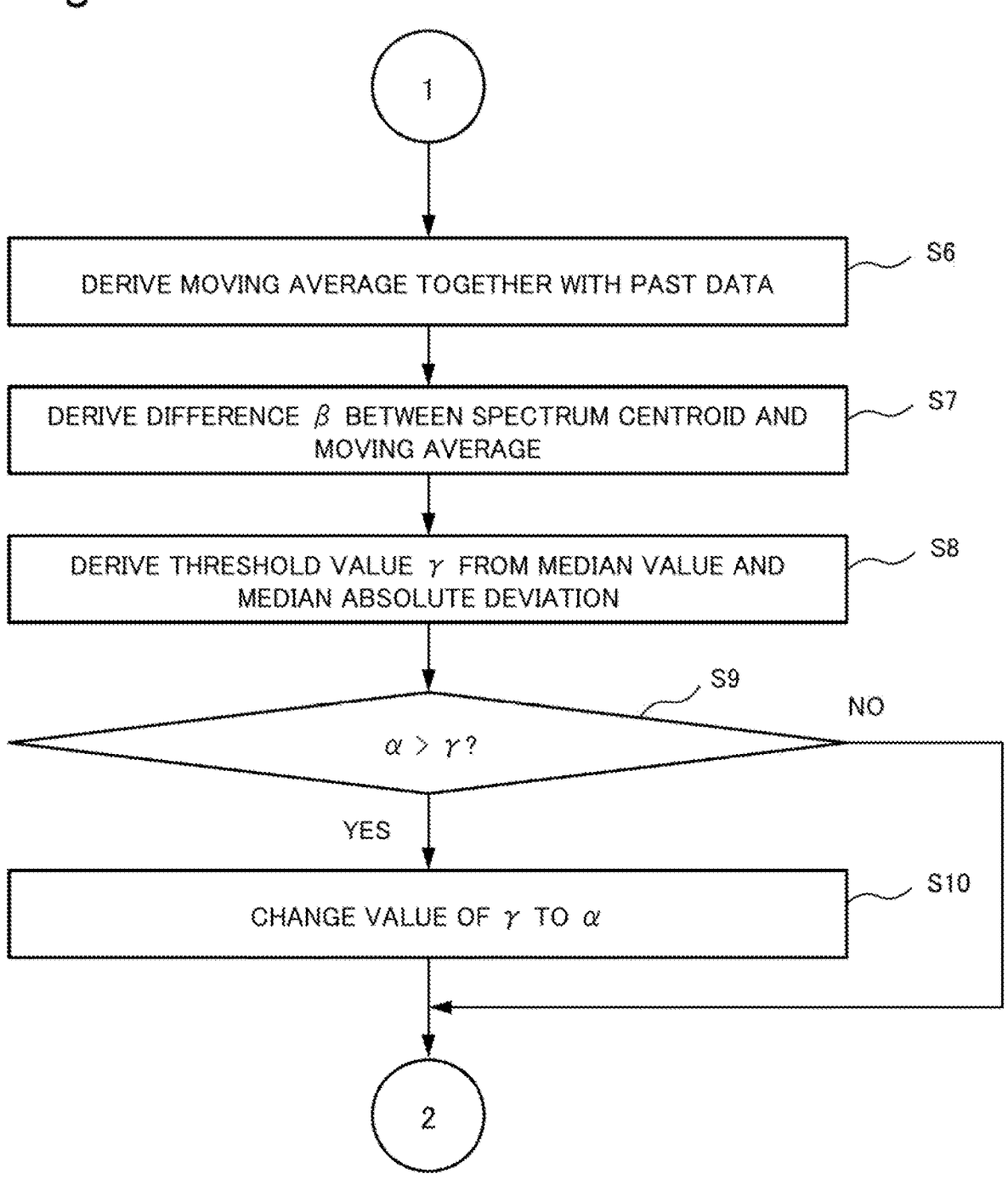
FIG. 3B is a flowchart for describing an operation of the optical fiber sensor of the first example embodiment of the present invention.
Figure 3C:
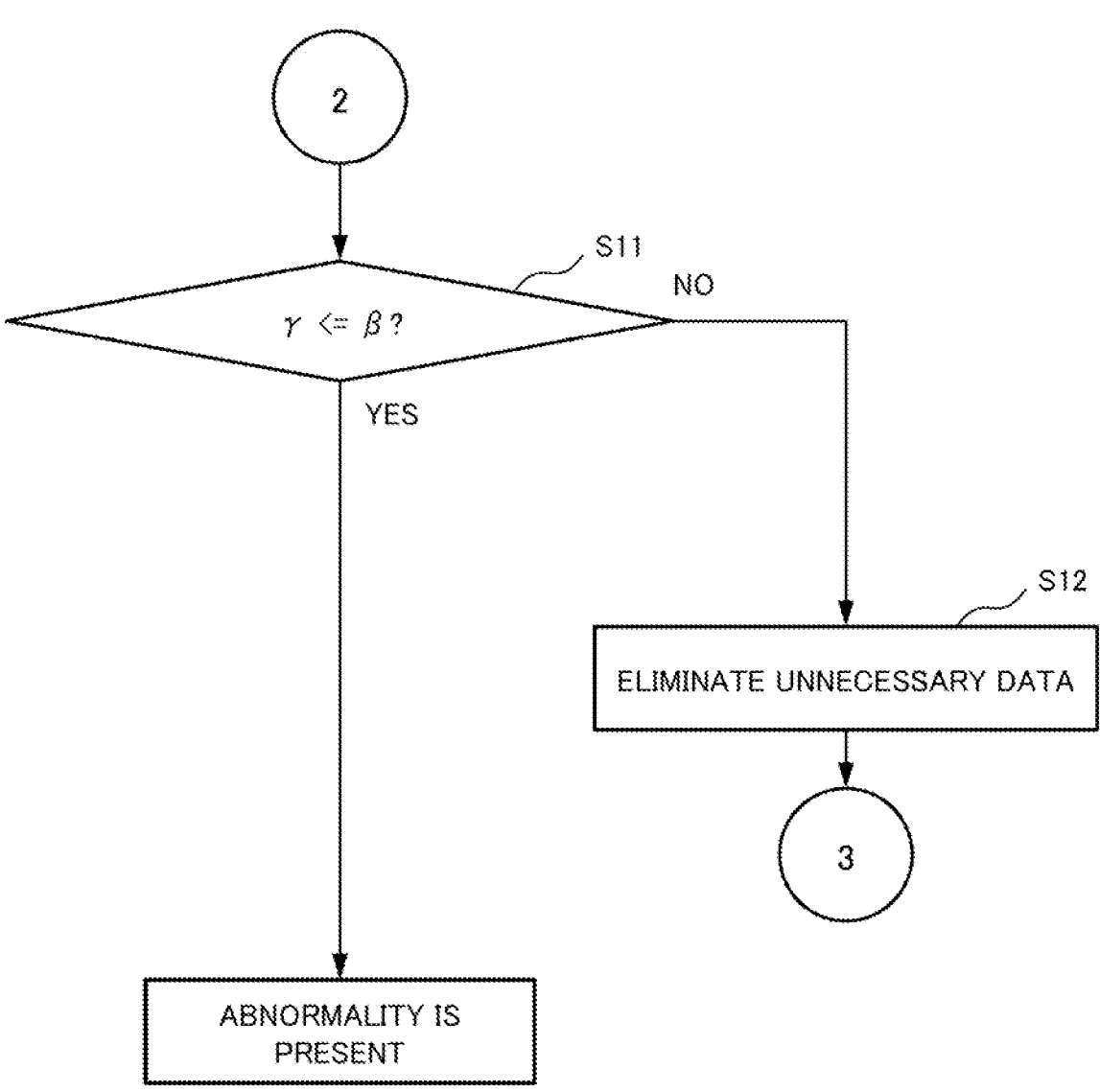
FIG. 3C is a flowchart for describing an operation of the optical fiber sensor of the first example embodiment of the present invention.
Figure 6:
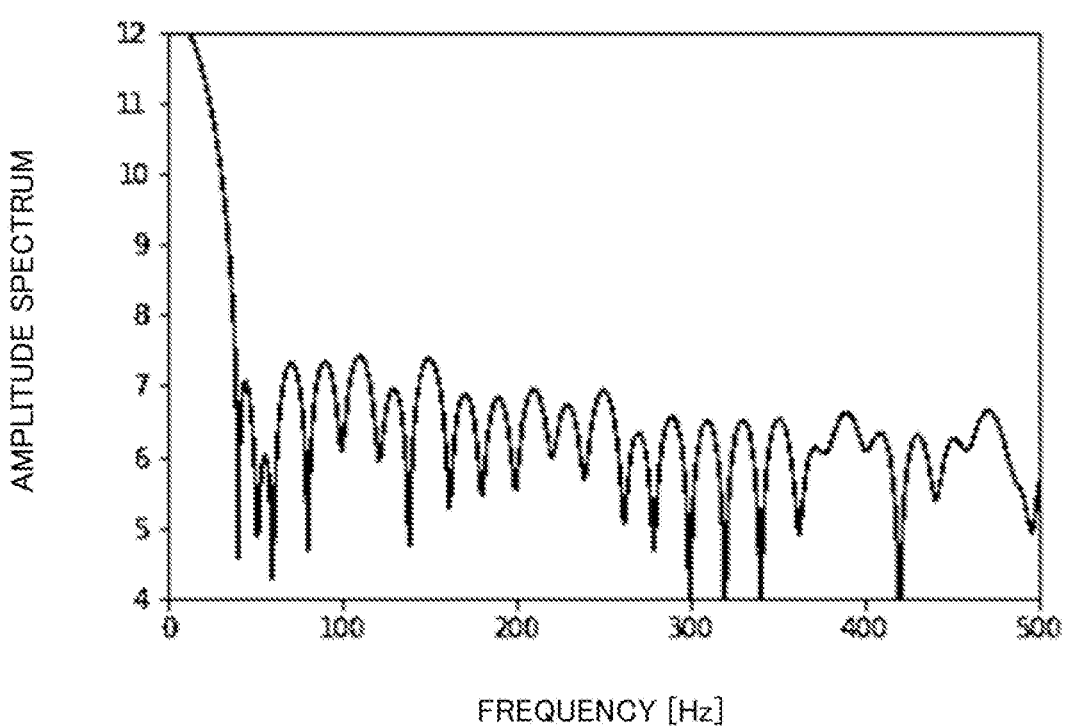
FIG. 6 is a graph illustrating one example of a frequency distribution of measured vibration.
Figure 7:
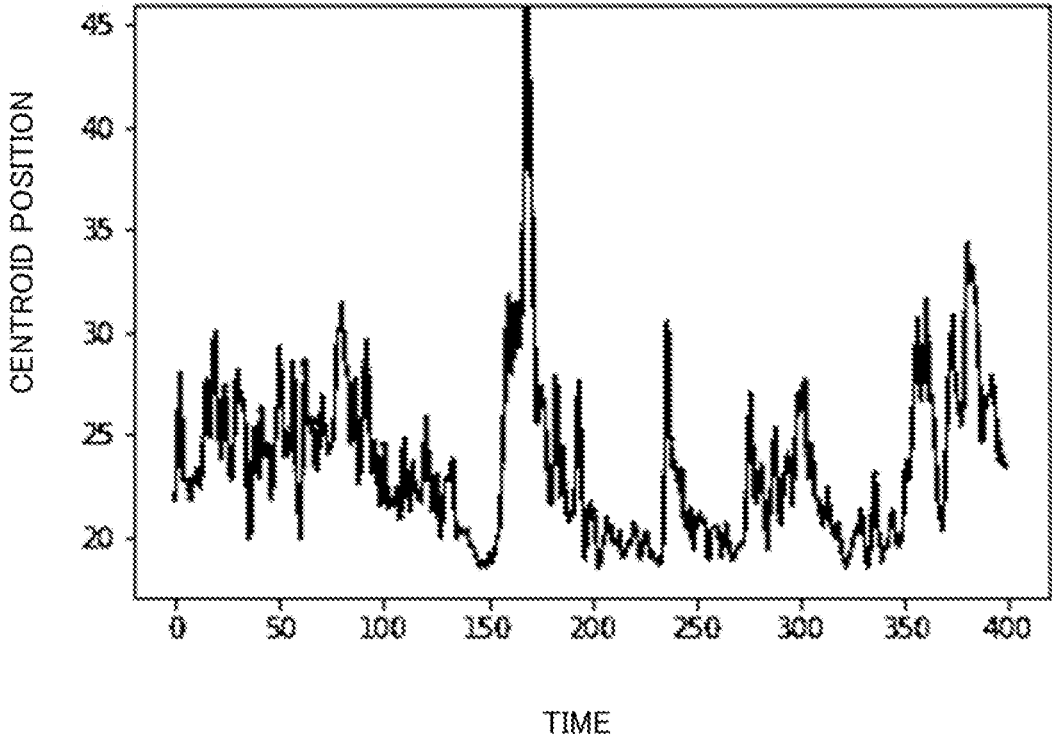
FIG. 7 is a graph illustrating a spectrum centroid of a frequency distribution of measured vibration for each minute time associated to the frequency distribution of the measured vibration in FIG. 6.
Figure 8:
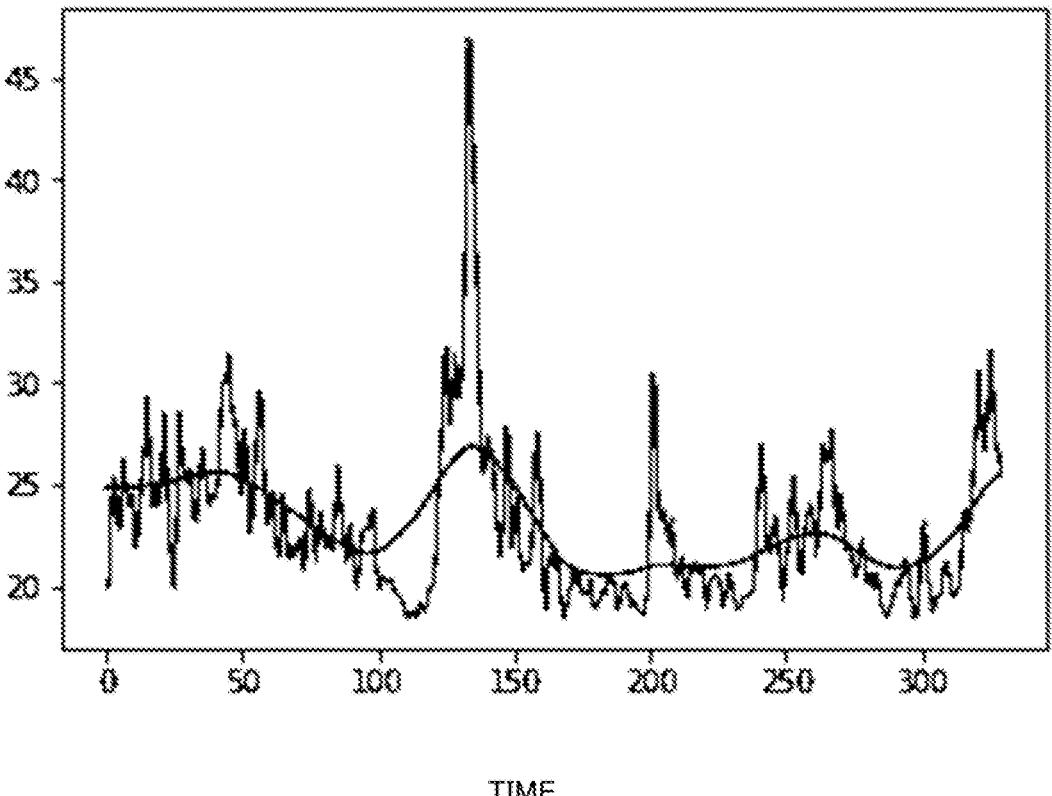
FIG. 8 is a graph illustrating the spectrum centroid of the frequency distribution in FIG. 7 by superimposing a linear weighted moving average thereon.

Next, with reference to flowcharts in FIGS. 3A to 3C, an operation of the optical fiber sensor of the present example embodiment and a detection method of the present example embodiment are described. First, the minimum threshold value derivation unit 7 derives a minimum threshold value α under a state in which a structure has no abnormality, for example, there is no pothole 50p in a road 50 in FIG. 4 (S1). Subsequently, the data calculation unit 1 acquires current vibration data at a certain observation point (S2). Subsequently, the frequency derivation unit 2 subjects frequency conversion to the acquired vibration data (S3), and generates data on an amplitude spectrum with respect to a frequency. In this manner, a frequency distribution of measured vibration as illustrated in FIG. 6 is acquired. FIG. 6 is a graph illustrating a frequency, but a vertical axis is in a logarithmical expression. Subsequently, the centroid derivation unit 3 derives a spectrum centroid (S4). The centroid derivation unit 3 derives the spectrum centroid for each time as illustrated in FIG. 7, from the frequency distribution of the measured vibration as illustrated in FIG. 6. The vertical axis in FIG. 7 indicates a centroid position. Since the vertical axis in FIG. 6 is in a logarithmical expression, and a value before taking a logarithm is used for derivation of FIG. 7, deviation from a value of the spectrum centroid predicted from FIG. 6 occurs. The memory 4 accumulates data on the spectrum centroid for each time (S5). Subsequently, the moving average difference derivation unit 6 derives a moving average for the data on the spectrum centroid for each time as well as the data on the spectrum centroid for each time in the past (S6). FIG. 8 illustrates the data on the spectrum centroid for each time by superimposing data on the linear weighted moving average thereon. Subsequently, the moving average difference derivation unit 6 derives a difference β between the spectrum centroid and the moving average (S7). Subsequently, the threshold value derivation unit 8 derives a threshold value γ from a median value and a median absolute deviation (S8). Subsequently, the abnormality determination unit 5 determines whether the threshold value γ is smaller than the minimum threshold value α (S9). When the threshold value γ is not smaller than the minimum threshold value α (No in S9), processing proceeds to S11. When the threshold value γ is smaller than the minimum threshold value α, a value of the threshold value γ is changed to the minimum threshold value α (S10), and then processing proceeds to S11.

Subsequently, the abnormality determination unit 5 compares the difference β between the spectrum centroid and the moving average with the threshold value γ. The comparison is regularly performed in a temporally continuous manner. As a result of the comparison, when the difference β between the spectrum centroid and the moving average is smaller than the threshold value γ (No in S11), the data is determined to be unnecessary, the unnecessary data is eliminated (S12), and processing returns to S2. As a result of the comparison, when the difference β between the spectrum centroid and the moving average is equal to or greater than the threshold value γ, the structure may have an abnormality at the observation point. With the determination result in S11, it is estimated that the structure has an abnormality. For a purpose of process simplification, when the difference β between the spectrum centroid and the moving average is equal to or greater than the threshold value γ, it may be estimated that the structure has an abnormality while omitting determination of whether the data is unnecessary.
(Advantageous Effects of Example Embodiment)

According to the optical fiber sensor of the present example embodiment, vibration information of a road, which occurs when an automobile passes on the road being one example of a structure is collected. A spectrum centroid is derived from the vibration information being collected in such a manner. Further, when the derived spectrum centroid exceeds a certain threshold value, an abnormality of the structure, that is, formation of a pothole in the road herein is detected.

Further preferably, a linear weighted moving average is acquired with regard to the derived spectrum centroid, and a moving average difference is acquired from a difference between the linear weighted moving average and an original spectrum centroid. In this manner, the linear weighted moving average is considered, and thus an influence by a gradual time-dependent change of the spectrum centroid is eliminated and detection accuracy for an abnormality of the structure is improved.

Further preferably, with regard to a threshold value used for detecting an abnormality of a structure, the threshold value is derived from a median value and a median absolute deviation, and thus robustness is achieved with respect to au outlier value in vibration information.

Further preferably, a minimum threshold value is introduced, and thus environment noise resistance is improved.

Accordingly, the optical fiber sensor of the present example embodiment enables detection of an abnormality of the structure with high accuracy, and enables a search for a pothole formed in a road as one example with high accuracy.

Second Example Embodiment

Figure 11:
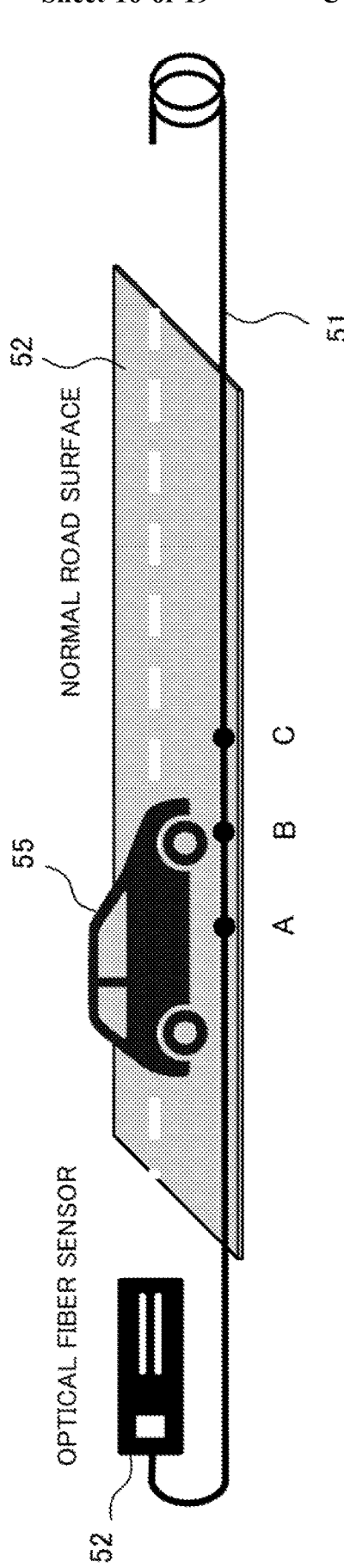
FIG. 11 is a conceptual diagram for describing an installation example of an optical fiber sensor system of an example embodiment of the present invention.

With reference to the drawings, an optical fiber sensor, a detection method, and an optical fiber sensor system of a second example embodiment of the present invention are described in detail. FIG. 11 is a block diagram for describing the optical fiber sensor of an example embodiment according to the second example embodiment of the present invention. The present example embodiment uses a configuration similar to that of the optical fiber sensor and the optical fiber sensor system of the first example embodiment.
(Operation of Example Embodiment)

Figure 3D:
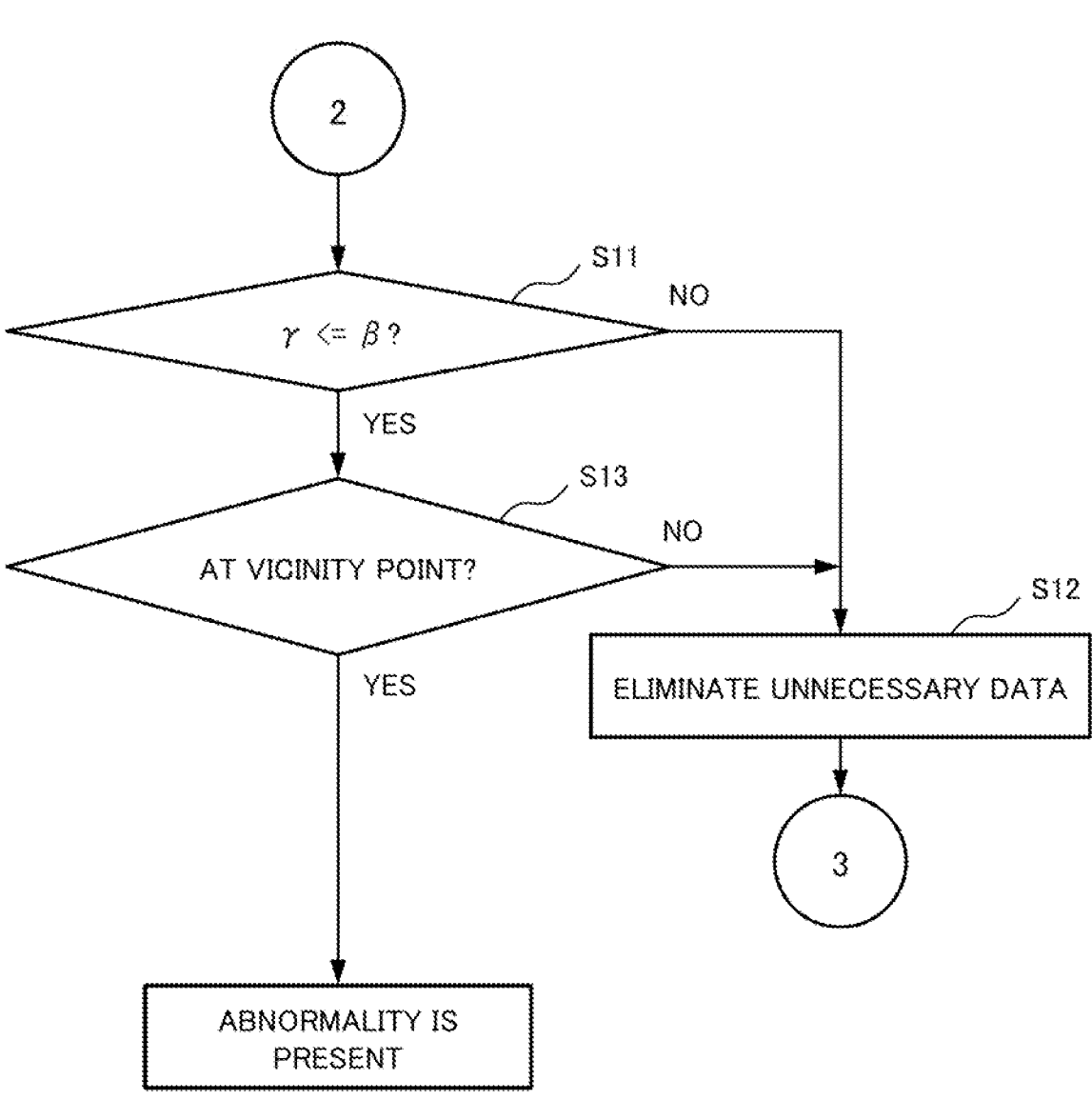
FIG. 3D is a flowchart for describing an operation of an optical fiber sensor of a second example embodiment of the present invention.

An operation of the optical fiber sensor of the present example embodiment and a detection method of the present example embodiment are described. Similarly to the first example embodiment described above, S1 to S9, or S1 to S10 illustrated in flowcharts in FIGS. 3A and 3B are executed. Subsequently, processing proceeds to S11 in FIG. 3D.

Subsequently, an abnormality determination unit 5 compares a difference β between a spectrum centroid and a moving average with a threshold value γ. As a result of the comparison, when the difference β between the spectrum centroid and the moving average is smaller than the threshold value γ (No in S11), data is determined to be unnecessary, the unnecessary data is eliminated (S12), and processing returns to S2. As a result of the comparison, when the difference β between the spectrum centroid and the moving average is equal to or greater than the threshold value γ (Yes in S11), processing proceeds to S13.

Subsequently, with respect to an observation point in a vicinity of the certain observation point, the difference β between the spectrum centroid and the moving average is also compared with the threshold value γ. With respect to the observation point in the vicinity of the certain observation point, when the difference β between the spectrum centroid and the moving average is equal to or greater than the threshold value γ (Yes in S13), it is also estimated that a structure has an abnormality.

Figure 12A:
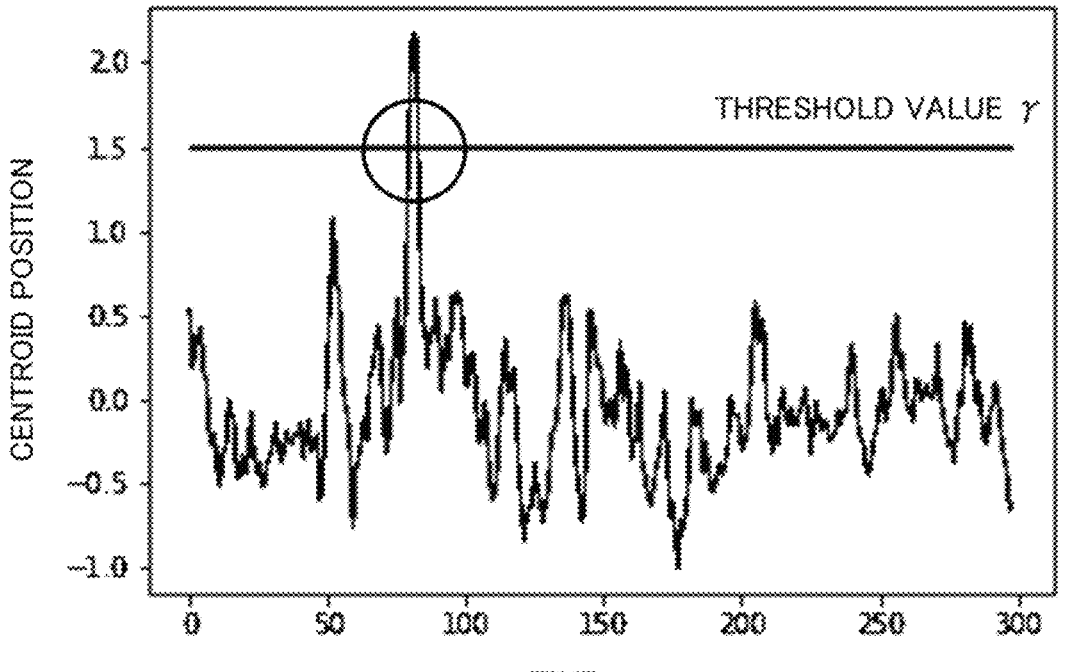
FIG. 12A is a graph illustrating one example of measurement results at an observation point A.
Figure 12B:
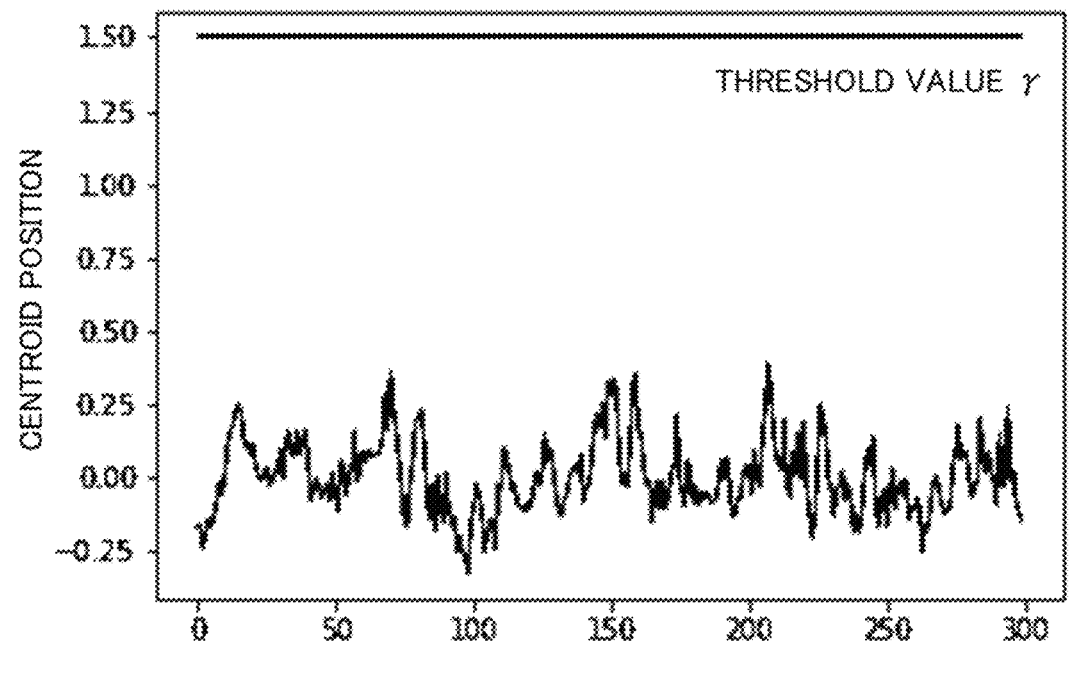
FIG. 12B is a graph illustrating one example of measurement results at an observation point B.
Figure 13:
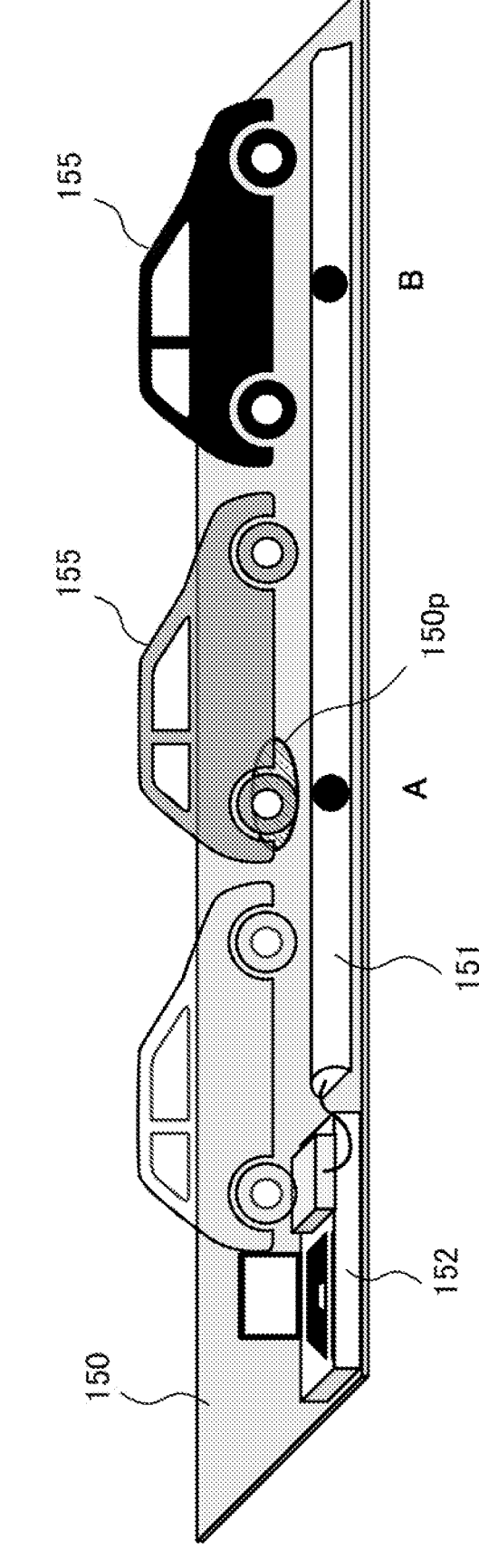
FIG. 13 is a conceptual diagram for describing an installation example of an optical fiber sensor system using an optical fiber sensor in the related art.
Figure 14A:
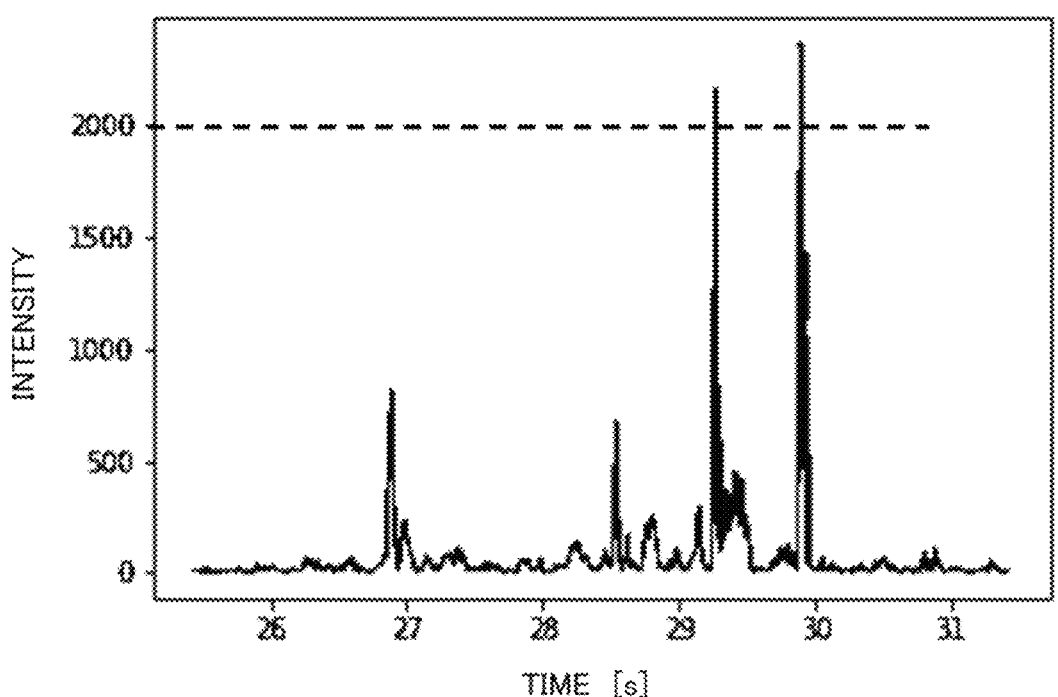
FIG. 14A is a graph illustrating one example of measurement data at an observation B in the optical fiber sensor system in the related art related art
Figure 14B:
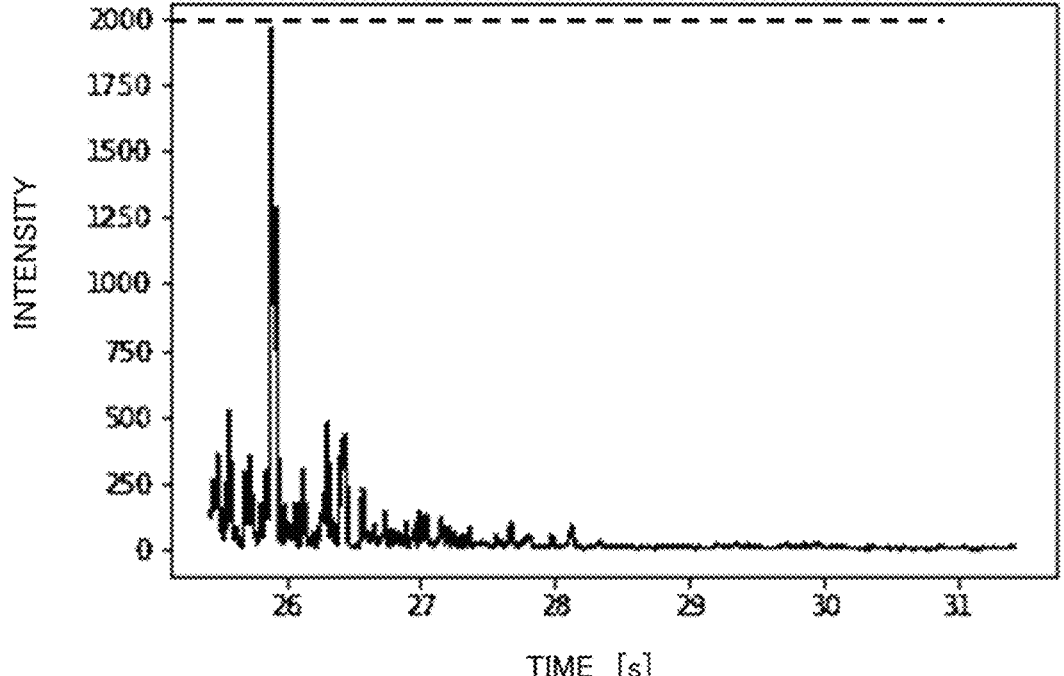
FIG. 14B is a graph illustrating one example of measurement data at a measurement point A in the optical fiber sensor system in the related art.

For example, the optical fiber sensor system as illustrated in FIG. 11 is assumed. An optical fiber 51 is laid along a longitudinal direction of a road 50, and an observation point A, an observation point B, and an observation point C that are a plurality of observation points are set in the optical fiber 51. FIG. 12A illustrates a change β of a difference between a spectrum centroid and a moving average of vibration measured at the observation point A, and FIG. 12B illustrates a change β of a difference between a spectrum centroid and a moving average of vibration measured at the observation point B. In each of the upper diagram and FIG. 12B, a horizontal axis indicates time, and a vertical axis indicates a centroid position. In each of the upper diagram and FIG. 12B, a horizontal line indicating a constant value near 1.5 of the vertical axis indicates the threshold value γ. Herein, the observation point B is an observation point in the vicinity of the observation point A. In the present example embodiment, when the difference β between the spectrum centroid and the moving average is equal to or greater than the threshold value γ at the observation point A (Yes in S11), the difference β between the spectrum centroid and the moving average is also compared with the threshold value γ at the observation point B being a vicinity point of the observation point A. When the difference β between the spectrum centroid and the moving average is also equal to or greater than the threshold value γ at the observation point B in the vicinity of the observation point A (Yes in S13), it is estimated that the structure has an abnormality. In FIG. 12A, a part in which the difference β between the spectrum centroid and the moving average exceeds the threshold value γ is a part surrounded by a circle.

In a case of FIG. 12B, there is no part in which the change β of the difference between the spectrum centroid and the moving average of the vibration measured at the observation point B exceeds the threshold value γ, and the difference β between the spectrum centroid and the moving average is smaller than the threshold value γ. Thus, in FIG. 12A, with regard to the change β of the difference between the spectrum centroid and the moving average of the vibration measured at the observation point A, a part in which the difference β between the spectrum centroid and the moving average exceeds the threshold value γ is determined as a false report due to environment noise, the data is determined to be unnecessary, the unnecessary data is eliminated (S12), and processing returns to S2.

Herein, description is made on a reason for enabling to determine that, in FIG. 12A, the part in which the change β of the difference between the spectrum centroid and the moving average of the vibration measured at the observation point A exceeds the threshold value γ is a false report due to environment noise. The optical fiber sensor senses a change of interference intensity of light as vibration. Since interference is used, the same interference intensity is not acquired every time even with application of the same vibration, and interference intensity changes due to addition of environment noise such as position deviation of a fiber cable. Thus, even when vibration is applied from a normal road surface, there may be a case in which a spectrum centroid largely changes. Since environment noise that may cause a false report varies according to a measurement point, a plurality of vicinity points are referred to in addition to one point. When a pothole occurs, vibration that largely changes a spectrum centroid is applied even at the vicinity point, and hence the spectrum centroid largely changes at all the points. Meanwhile, in a case of a normal road surface, a point with a small change of the spectrum centroid is included, and hence this method enables discrimination of a false report. With regard to a risk of detection omission in FIG. 12B, it cannot be assured that the risk is reduced to zero, but the risk is conceivably low because vibration occurring at a time of passing on a pothole propagates to the vicinity point.
(Advantageous Effects of Example Embodiment)

Similarly to the first example embodiment described above, according to the optical fiber sensor of the present example embodiment, an abnormality of a structure can be detected with high accuracy, and a pothole formed in a road as one example of an abnormality of the structure can be searched with high accuracy.

Further, in the present example embodiment, an abnormality of the structure is detected in consideration of a comparison result at an observation point in the vicinity of a certain observation point as well as a comparison result at the certain observation point. Accordingly, an influence of a false report due to environment noise can be reduced, and presence or absence of an abnormality of the structure can be detected with higher accuracy as compared to the first example embodiment.

The optical fiber sensor has a characteristic that enable continuous measurement at a desired position of an optical fiber laid along a structure as an observation point. In the present example embodiment, through use of the characteristic, a false report on detection of presence or absence of an abnormality of the structure can be reduced with reference to a result at the observation point in the vicinity of the certain observation point as well as a result at the certain observation point. A position away from the certain observation point by determination at the observation point and a minimum space resolution of the optical fiber sensor can be set as the observation point in the vicinity.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

A part or the whole of the above-described example embodiments may be described as in supplementary notes given below, but are not limited thereto.

(Supplementary Note 1) A detection method including:
collecting vibration information on a structure, occurring when an object passes near the structure;
deriving a spectrum centroid from the vibration information being collected; and
detecting an abnormality of the structure when the spectrum centroid exceeds a certain threshold value.

(Supplementary Note 2) The detection method according to supplementary note 1, wherein
the object is any one of a gaseous body, a liquid body, and a solid body that pass by a vicinity of a surface of the structure.

(Supplementary Note 3) The detection method according to supplementary note 1 or 2, further including:
using an optical fiber running in a vicinity of the structure, and a light source that introduces pulsed light with a specific cycle to the optical fiber; and
collecting vibration information occurring when an object passes near the structure, in a form of return light associated to pulsed light being introduced from the light source to the optical fiber.

(Supplementary Note 4) The detection method according to supplementary note 3, further including:
setting a plurality of observation points away from one another in an optical fiber running in a vicinity of the structure; and
performing detection of an abnormality of the structure when a spectrum centroid exceeds a certain threshold value at all points including one observation point of the plurality of observation points and one or a plurality of observation points in a vicinity of the one observation point.

(Supplementary Note 5) The detection method according to supplementary note 3, further including:
setting a plurality of observation points away from one another in an optical fiber running in a vicinity of the structure; and
performing detection of an abnormality of a structure when all pieces of determination including determination at one observation point of the plurality of observation points and determination at one or a plurality of observation points away from the one observation point by a minimum space resolution relating to detection indicate an abnormality of a structure.

(Supplementary Note 6) The detection method according to any one of supplementary notes 1 to 5, wherein
the certain threshold value is derived from a median value and a median absolute deviation that are acquired from spectrum centroid data being accumulated for a certain time period.

(Supplementary Note 7) The detection method according to any one of supplementary notes 1 to 6, further including acquiring a moving average of spectrum centroid data for a certain time period, and detecting an abnormality of a structure when a difference between a spectrum centroid and a moving average exceeds a threshold value.

(Supplementary Note 8) The detection method according to any one of supplementary notes 1 to 7, further including, when the certain threshold value is smaller than a minimum threshold value, changing the certain threshold value to the value.

(Supplementary Note 9) An optical fiber sensor including:

an optical fiber running in a vicinity of a structure;

a light source that introduces pulsed light with a specific cycle to the optical fiber; and an optical sensor that detects return light acquired by introducing the pulsed light to the optical fiber, the optical fiber sensor determining that the structure has an abnormality when a spectrum centroid in vibration information exceeds a certain threshold value.

(Supplementary Note 10) The optical fiber sensor according to supplementary note 9, further including an abnormality determination unit that determines that the structure has an abnormality in a vicinity of an observation point when all pieces of determination including determination at the observation point and determination at one or a plurality of vicinity points away from the observation point by a minimum space resolution of the optical sensor indicate that an abnormality is present.

(Supplementary Note 11) The optical fiber sensor according to supplementary note 9 or 10, further including a minimum threshold value derivation unit that acquires a minimum threshold value being slightly greater than a maximum value from variations of a spectrum centroid being measured in advance under a state in which the structure has no abnormality.

REFERENCE SIGNS LIST

1 Data calculation unit
2 Frequency derivation unit
3 Centroid derivation unit
4 Memory
5 Abnormality determination unit
6 Moving average difference derivation unit
7 Minimum threshold value derivation unit
8 Threshold value derivation unit
11 Vibration information collection means
12 Centroid derivation means
13 Abnormality detection means
50 Road
50p Pothole
51 Optical fiber
52 Sensing device
55 Automobile

What is claimed is:

1. A detection method comprising:

collecting vibration information on a structure having a solid surface, occurring when an object passes by the structure and the object is any one of a gaseous body, a liquid body, and a solid body;

deriving a spectrum centroid from the vibration information being collected; and detecting an abnormality of the structure when the spectrum centroid exceeds a threshold value;

collecting, using an optical fiber and a light source that introduces pulsed light with a specific cycle to the optical fiber, the vibration information occurring when the object passes near the structure, in a form of return light associated to the pulsed light being introduced from the light source to the optical fiber, the optical fiber running in a vicinity of the structure, and setting a plurality of observation points away from one another in the optical fiber running in the vicinity of the structure, the plurality of observation points comprising at least a first observation point, a second observation point, and a third observation point, wherein the second observation point and the third observation point are both in a vicinity of the first observation point; and detecting the abnormality of the structure based on determining that the spectrum centroid exceeds a certain threshold value at least both at the first observation point and also at any of the second observation point and the third observation point.

2. The detection method according to claim 1, wherein the threshold value is derived from a median value and a median absolute deviation that are acquired from data of the spectrum centroid being accumulated for a time period.

3. The detection method according to claim 1, further comprising:

acquiring a moving average of data of the spectrum centroid for a time period, and detecting the abnormality of the structure when a difference between the spectrum centroid and a moving average exceeds the threshold value.

4. The detection method according to claim 1, further comprising based on the threshold value being determined to be smaller than a minimum threshold value, changing the threshold value to the minimum threshold value.

5. A detection method comprising:

collecting vibration information on a structure having a solid surface, occurring when an object passes by the structure and the object is any one of a gaseous body, a liquid body, and a solid body;

deriving a spectrum centroid from the vibration information being collected; and detecting an abnormality of the structure when the spectrum centroid exceeds a threshold value;

collecting, using an optical fiber and a light source that introduces pulsed light with a specific cycle to the optical fiber, the vibration information occurring when the object passes near the structure, in a form of return light associated to the pulsed light being introduced from the light source to the optical fiber, the optical fiber running in a vicinity of the structure, and setting a plurality of observation points away from one another in the optical fiber running in the vicinity of the structure, the plurality of observation points comprising at least a first observation point, a second observation point, and a third observation point, wherein the second observation point and the third observation point are both away from the first observation point; and detecting the abnormality of the structure based on determining both that the abnormality of the structure is indicated at least both at the first observation point and also at any of the second observation point and the third observation point.

6. The detection method according to claim 5, wherein the threshold value is derived from a median value and a median absolute deviation that are acquired from data of the spectrum centroid being accumulated for a time period.

7. The detection method according to claim 5, further comprising acquiring a moving average of data of the spectrum centroid for a time period, and detecting the abnormality of the structure when a difference between the spectrum centroid and a moving average exceeds the threshold value.

8. The detection method according to claim 5, further comprising, based on the threshold value being determined to be smaller than a minimum threshold value, changing the threshold value to the minimum threshold value.

9. The detection method according to claim 5, wherein the second observation point and the third observation point are both away from the first observation point by at least a predetermined amount of space.

10. An optical fiber sensor comprising:

an optical fiber running in a vicinity of a structure having a solid surface;

a light source configured to introduce pulsed light with a specific cycle to the optical fiber;

an optical sensor configured to detect return light acquired by introducing the pulsed light to the optical fiber, and the optical fiber sensor is configured to determine that the structure has an abnormality when a spectrum centroid in vibration information exceeds a threshold value; and an abnormality determination circuit configured to detect the abnormality of the structure based on determining both that the abnormality of the structure is indicated at least both at a first observation point and also at any of a second observation point and a third observation point, wherein the second observation point and the third observation point are both away from the first observation point by at least a predetermined amount of space.

11. The optical fiber sensor according to claim 10, further comprising:

a minimum threshold value derivation circuit configured to acquire a minimum threshold value being slightly greater than a maximum value from variations of another spectrum centroid being measured in advance under a state in which the structure has no abnormality.

12. The optical fiber sensor according to claim 10, further comprising a minimum threshold value derivation circuit configured to acquire a minimum threshold value being slightly greater than a maximum value from variations of another spectrum centroid being measured in advance under a state in which the structure has no abnormality.

* * * * *